Patented Jan. 26, 1937

2,068,877

UNITED STATES PATENT OFFICE 2,068,877

PREPARATION OF TITANIUM COMPOUNDS

Howard Spence and Sydney Francis William Crundall, Manchester, England, assignors to Peter Spence & Sons, Limited, Manchester, England No Drawing. Application February 1, 1934, Serial No. 709,296. In Great Britain February 7, 1933

8 Claims. (Cl. 23—105)

The employment of titanium compounds in the arts for dyeing, mordanting, tanning etc. in the treatment of textiles, leather and the like and for other purposes is known and compounds of titanium such as the titanium salts of mineral acids, e. g., sulphuric acid, of organic acids, e. g., oxalic acid, lactic acid, or the double salts of titanium and an alkali metal, e. g., sodium, with mineral acids, e. g., sulphuric acid, in the form of the compound $TiOSO_4Na_2SO_4$ aq. or with organic acids, e. g., oxalic acid in the form of titanium potassium oxalate, or mixtures of mineral acid titanium salts such as the double sulphate $TiOSO_4Na_2SO_4$ aq. with organic acids and/or their salts e. g., oxalic acid, sodium binoxalate, have been used for such purposes. Of these, the products free from the mineral acids, sulphuric acid and hydrochloric acid, have proved to be generally the more stable in use, i. e. to have little or no tendency to precipitate insoluble titanium compounds on dilution and/or on heating. The compounds containing mineral acid, in the form e. g., of sulphuric acid, on the other hand, may usually be made more economically, but are usually incompletely stable unless the total acid present after allowing for other bases than titanium is in excess of that required for a normal salt and such excess of acid part or all of which may be present as mineral acid, e. g., sulphuric acid, is, for some purposes, unsuitable and under some conditions of usage may have a deleterious action on the material being treated.

We have now found that soluble compounds or mixtures containing titanium in association with phosphoric acid and/or suitable phosphates and suitable organic acids, e. g., oxalic acid, tartaric acid and/or suitable salts of organic acids, e. g., sodium binoxalate, can be prepared and that the solutions obtainable therefrom are especially suitable for use in dyeing, mordanting, tanning and for other purposes, are more economical to produce than compounds such as titanium potassium oxalate, may possess very high stability even when the organic acid present amounts to only about, e. g., 1¼ mol. or less of divalent acid per mol. $TiO_2$ and have minimum tendering action on materials dyed, mordanted or otherwise treated therewith. In addition, we find that such solutions dye or mordant more evenly than those hitherto used for the purpose and may, owing to the presence of the phosphoric acid, give novel effects as mordants, e. g., in completeness of precipitation, in tone, brightness etc., in the formation of colour lakes, in tanning, etc. We find that such soluble compounds or mixtures may be prepared by combining the desired ingredients in different ways. We may, for example, mix together under suitable conditions of concentration and temperature, titanium phosphate, such as e. g., the basic titanium phosphates described in British Patents Nos. 261,051 and 290,683 and particularly basic phosphate precipitated from solutions containing not very high proportion of free acid e. g., from solutions containing about 2 mols of acid expressed as $PO_4$ per mol. $TiO_2$, and sodium binoxalate as we find that such titanium phosphates, although they are very difficultly soluble in mineral acid solutions, are readily soluble in the presence of suitable organic salts and their acid salts, such as e. g. oxalic acid or sodium binoxalate; or we may similarly mix readily acid soluble hydrated titanium oxide, a suitable organic acid and/or salt of an organic acid, e. g., oxalic acid or sodium binoxalate, and phosphoric acid and/or a suitable phosphate, e. g., sodium phosphate, or we may similarly mix titanium salts of organic acids, e. g., basic titanium oxalate, phosphoric acid and/or a suitable phosphate, and any desired amount of a suitable organic acid and/or salt of an organic acid, e. g., oxalic acid and/or sodium binoxalate, and our invention consists in such preparation and use of such soluble compounds and mixtures containing titanium in association with phosphoric acid and/or a suitable phosphate and suitable organic acids and/or their salts.

In carrying our invention into effect we may intimately mix together by known means the titanium compound with the other ingredients all or some of which may suitably be in paste or dry form, or in solution, heat the mixture with the minimum amount of water required to effect complete solution and evaporate the resultant solution by known means, where necessary, until it attains the desired concentration or until it sets to a solid product having the desired percentage of $TiO_2$. We prefer to work with materials of such concentration that the minimum amount of evaporation or not any is subsequently required. Thus, for example, we may intimately mix together by known means a quantity of a basic titanium phosphate paste prepared by the methods described in British Patents Nos. 261,051 and 290,683 and which may suitably have a phosphoric acid content of about 0.2 mol. $P_2O_5$ to 1 mol. $TiO_2$ with a quantity of sodium binoxalate equivalent to about 1 mol. on the $TiO_2$ present, heat until solution is effected and, if necessary, evaporate the resultant solution by known means until it yields a solid product which is readily soluble and stable in water and which may contain, e. g., 25% by weight of $TiO_2$, or we may intimately mix together by known means a quantity of basic titanium oxalate containing say 0.4 mol. $C_2O_3$ per mol. of $TiO_2$ with oxalic acid sufficient to bring the total $C_2O_3$ content to about 1 to 1¼ mols per mol. of $TiO_2$ and the desired quantity of sodium phosphate, e. g. equivalent to about 0.2 to 0.3 mol. $P_2O_5$ per mol. $TiO_2$, heat until solution is effected and treat as before, or we may intimately mix together by known means a quantity of orthotitanic hydrate with the equivalent of about 1 to 1¼ mols of sodium binoxalate and the desired quantity of phosphoric acid, heat until solution is effected and treat as before.

To bring about the desired combinations we may use organic acids alone or their salts with suitable metals, e. g. their sodium salts, or mixtures of the acids and their salts in any desired proportions, provided sufficient free acid is present to keep the titanium in solution. Other suitable organic acids, such as e. g. lactic acid, tartaric acid, and their salts may be employed but oxalic acid may offer advantages in cost.

If desired, we may subsequently mix the dry product obtained as described with additional organic acid and/or a suitable salt of an organic acid e. g. oxalic acid or sodium binoxalate.

What we claim as our invention and desire to secure by Letters Patent is:—

1. The process for producing a soluble titanium material suitable for dyeing, mordanting, tanning, lake manufacture and the like which process comprises mixing together materials containing titanium, phosphoric acid and an oxalic acid, the oxalic acid being present in amounts not less than one mol. of acid per mol. of $TiO_2$, and heating the mixture to effect solution.

2. The process for producing a soluble titanium material suitable for dyeing, mordanting, tanning, lake manufacture and the like which process comprises mixing together titanium phosphate having an acid content of about 0.2 mol. $P_2O_5$ to 1 mol. $TiO_2$, and sodium binoxalate in an amount equivalent to about 1 mol. per mol. of $TiO_2$, and heating the mixture to effect solution.

3. The process for producing a soluble titanium material suitable for dyeing, mordanting, tanning, lake manufacture and the like which process comprises mixing together basic titanium oxalate containing about 0.4 mol. $C_2O_3$ per mol. of $TiO_2$, oxalic acid in an amount sufficient to bring the total $C_2O_3$ content to about 1 to 1¼ mols. per mol. of $TiO_2$ and sodium phosphate having an acid content of from 0.2 to 0.3 mol. $P_2O_5$ per mol. of $TiO_2$, and heating the mixture to effect solution.

4. The process for producing a soluble titanium material suitable for dyeing, mordanting, tanning, lake manufacture and the like which process comprises mixing together orthotitanic hydrate, sodium binoxalate in amounts equivalent to about 1 to 1¼ mols. per mol. $TiO_2$ and phosphoric acid, and heating the mixture to effect solution.

5. A material suitable for dyeing, mordanting, tanning, lake manufacture and the like which comprises the resultant product of a solution of materials containing titanium, phosphoric acid and oxalic acid, the oxalic acid being present in an amount of not less than 1 mol. per mol. of $TiO_2$.

6. A material suitable for dyeing, mordanting, tanning, lake manufacture and the like which comprises the resultant product of a solution of titanium phosphate having an acid content of about 0.2 mol. $P_2O_5$ per mol. $TiO_2$, and sodium binoxalate in an amount equivalent to about 1 mol. per mol. of $TiO_2$.

7. A material suitable for dyeing, mordanting, tanning, lake manufacture and the like which comprises the resultant product of a solution of basic titanium oxalate containing about 0.4 mol. $C_2O_3$ per mol. $TiO_2$, oxalic acid in an amount sufficient to bring the $C_2O_3$ content to about 1 to 1¼ mols. per mol. $TiO_2$, and sodium phosphate having an acid content of from 0.2 to 0.3 mol. $P_2O_5$ per mol. $TiO_2$.

8. A material suitable for dyeing, mordanting, tanning, lake manufacture and the like which comprises the resultant product of a solution of orthotitanic hydrate, sodium binoxalate in an amount equivalent to about 1 to 1¼ mols. per mol. $TiO_2$, and phosphoric acid.

HOWARD SPENCE.
SYDNEY FRANCIS WILLIAM CRUNDALL.